(12) United States Patent
Arimilli et al.

(10) Patent No.: US 7,360,021 B2
(45) Date of Patent: Apr. 15, 2008

(54) SYSTEM AND METHOD FOR COMPLETING UPDATES TO ENTIRE CACHE LINES WITH ADDRESS-ONLY BUS OPERATIONS

(75) Inventors: Ravi Kumar Arimilli, Austin, TX (US); Guy Lynn Guthrie, Austin, TX (US); Hugh Shen, Austin, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 10/825,189

(22) Filed: Apr. 15, 2004

(65) Prior Publication Data

US 2005/0251623 A1    Nov. 10, 2005

(51) Int. Cl.
*G06F 12/12*    (2006.01)
(52) U.S. Cl. .................. 711/118; 711/122; 711/133; 711/141; 710/310
(58) Field of Classification Search ................ 711/118, 711/122, 133, 141; 710/310
See application file for complete search history.

(56) References Cited

U.S. PATENT DOCUMENTS

| | | | | |
|---|---|---|---|---|
| 5,023,776 A | * | 6/1991 | Gregor | 711/122 |
| 6,105,112 A | * | 8/2000 | Arimilli et al. | 711/141 |
| 6,173,371 B1 | * | 1/2001 | Arimilli et al. | 711/146 |
| 6,557,084 B2 | * | 4/2003 | Freerksen et al. | 711/147 |
| 6,678,799 B2 | * | 1/2004 | Ang | 711/141 |
| 6,772,298 B2 | * | 8/2004 | Khare et al. | 711/144 |
| 6,976,130 B2 | * | 12/2005 | Chi | 711/143 |
| 7,089,364 B2 | * | 8/2006 | Arimilli et al. | 711/133 |
| 7,188,216 B1 | * | 3/2007 | Rajkumar et al. | 711/118 |
| 2001/0052053 A1 | * | 12/2001 | Nemirovsky et al. | 711/138 |
| 2004/0064643 A1 | * | 4/2004 | Jamil et al. | 711/118 |
| 2005/0251660 A1 | * | 11/2005 | Bell et al. | 712/225 |

OTHER PUBLICATIONS

Eberhard et al., "Storage Access Mechanism for Vector Operands", Dec. 1994, IBM Technical Disclosure Bulletin, vol. 37, No. 12, pp. 629-632.*

* cited by examiner

*Primary Examiner*—Sanjiv Shah
*Assistant Examiner*—Arpan Savla
(74) *Attorney, Agent, or Firm*—Casimer K. Salys; Dillon & Yudell LLP

(57) ABSTRACT

A method and processor system that substantially eliminates data bus operations when completing updates of an entire cache line with a full store queue entry. The store queue within a processor chip is designed with a series of AND gates connecting individual bits of the byte enable bits of a corresponding entry. The AND output is fed to the STQ controller and signals when the entry is full. When full entries are selected for dispatch to the RC machines, the RC machine is signaled that the entry updates the entire cache line. The RC machine obtains write permission to the line, and then the RC machine overwrites the entire cache line. Because the entire cache line is overwritten, the data of the cache line is not retrieved when the request for the cache line misses at the cache or when data goes state before write permission is obtained by the RC machine.

5 Claims, 8 Drawing Sheets

US 7,360,021 B2

SYSTEM AND METHOD FOR COMPLETING UPDATES TO ENTIRE CACHE LINES WITH ADDRESS-ONLY BUS OPERATIONS

RELATED APPLICATION

The present invention is related to the subject matter of the following commonly assigned, co-pending U.S. patent application Ser. No. 10/825,188 entitled "METHOD TO STALL STORE OPERATIONS TO INCREASE CHANCES OF GATHERING FULL ENTRIES FOR UPDATING CACHELINES" filed on Apr. 15, 2004. The content of the above-referenced application is incorporated herein by reference.

BACKGROUND OF THE INVENTION

1. Technical Field

The present invention relates generally to data processing systems and specifically to processor-cache operations within data processing systems. Still more particularly, the present invention relates to updates of entire cache lines with processor-issued store operations without requiring data transfer on the system bus.

2. Description of the Related Art

Increasing efficiency of data operations at the processor-cache level is an important aspect of processor chip development. Modern microprocessors typically contain entire storage hierarchies (caches) integrated onto a single integrated circuit. For example, one or more processor cores containing L1 instruction and/or data caches are often combined with a shared on-chip L2 cache. In some designs, the directory portion of an L3 cache is also integrated on-chip with the data portion of the L3 cache residing in a separate external chip.

In systems with on-chip caches, processor-issued data store operations typically target only a small portion (i.e., 1-byte to 16-bytes) of a cache line compared to the entire cache line (typically 128-bytes). For example, it is possible for a processor-issued store operation to target only a single byte granule of a 128-Byte cache line to update, and cache line updates are completed via a combination of these individual store operations, which may occur sequentially. In order to increase efficiency, processor chips are often designed with a "store queue" that is typically placed between a processor core and the L2 cache. A store queue typically contains byte-addressable storage for a number of cache lines (usually 8 to 16 cache lines).

FIG. 2 illustrates a prior art representation of specific hardware and logic components of a processor chip that are utilized to complete data store operations. As illustrated, processor chip 201 includes a processor core 203, store queue 207 with store queue (STQ) controller 205, and read claim (RC) dispatch logic 219. STQ controller 205 includes arbitration logic 206 utilized for selecting entries from the store queue 207, as described below. RC dispatch logic 219 supports a series of RC machines 221, which complete the actual data store operations at the lower-level cache (not shown).

The store queue 207 provides several rows (entries) for temporarily storing and tracking processor-issued stores. Each row is divided into several columns that provide byte enable register 209, address register 211, data register 213, controls bits 215, and valid bit 217. Data register 213 and address register 211 store data issued from the processor core 203 and the corresponding data (memory) address, respectively. Byte enable register 209 includes a number of bookkeeping bits. Conventionally the number of bits corresponds to the number of individually addressable storage granules within a cache line. Thus, for example, for a 128-byte cache line entry and byte store operations, byte enable register 209 maintains 128 bits for tracking single-byte processor-issued stores. This enables tracking of specific bytes (or group of bytes) within a 128-byte cache line entry that is being updated by the processor.

Valid bit 217 indicates to STQ controller 205 when data within a particular row of the store queue 207 is valid, and valid bit 217 is checked before arbitration logic 206 selects a row of data (or an entry) to forward to RC Dispatch logic 219. Once a valid bit is set, arbitration logic 206 is able to select the entry regardless of whether additional stores to that cache line are being sent by the processor core. Control Bits 215 represents an assortment of additional bits that are utilized by STQ controller 205. The functionality of several of the above-described columns is referenced within the description of the data store operations below.

Store operations typically originate at the processor core 203 and are temporarily stored in an entry of the store queue 207. The store operations target a particular cache line (or portion of the cache line) identified by the address within the store operation, and the operation also provides data to be stored within the addressed portion of that cache line (e.g., byte 12).

The store operations update particular bytes within the cache line entry. Concurrent with these data updates, corresponding bits within byte enable register are set to track which bytes within the cache line entry have been updated by store operations. Typically, a series of store operations writing to a same entry in the store queue are absorbed by the store queue entry before the line is dispatched to the L2 cache. This absorption of multiple store operations into a single entry is referred to as "gathering" stores, since multiple different stores addressing the same cache line are "gathered" into an entry of the store queue buffer before the line is presented to the L2 cache for storage.

FIG. 3A illustrates a process by which store operations issued by a processor are assigned to an entry within the store queue. The process begins at step 301 and proceeds to step 302 at which a determination is made whether there is an available entry within the store queue to assign a next store operation. When all entries of the store queue have been assigned (i.e., there is no available entry to assign to a new store operation and no gatherable entry exists for that store operation), the processor core suspends issuance of new store operations to the queue until an entry becomes available, as indicated at step 303.

An entry becomes available when the contents of that entry are dispatched to an RC machine. That is, an entry becomes available when an older cache line entry is removed from the store queue and sent to the L2 cache for storage therein. A variety of different policies (some described below) may be utilized to determine when cache lines are moved from the store queue to be stored in the L2 cache. In conventional systems, a tracking mechanism is provided within the core and/or the store queue to track when there are available entries to assign to store operations being issued by the core. The core is thus able to suspend issuance of store operations when those operations cannot be buffered within the store queue.

Returning to decision step 302, when there is an available entry, the processor core issues a store operation to the store queue as shown at step 304. The store operation is received at the store queue, and a determination is made at step 305 whether a previously existing entry (for the same cache line address) is currently available for gathering the store operation. If, at step 305, there is no existing entry available to gather the store operation, a new entry is allocated to the store operation, as shown at step 307. However, when there is an existing entry that is gatherable, the entry is updated with the data of the store operation as shown at step 309.

An existing entry is usually available for gathering when the entry holding previously issued store operation(s) for the same cache line address has not yet been selected for dispatch to an RC machine. In conventional implementations, once an entry in the store queue has been assigned to a target cache line, subsequent stores targeting that cache line are gathered within that entry until a condition occurs that prevents further gathering of store operations to that entry. The STQ controller 205 controls when stores to a cache line are allowed to gather. For example, the STQ controller may prevent further gathering of stores to an entry when the entry is selected for dispatch. Also, gathering is typically stopped when a barrier operation is encountered, as is known to those skilled in the art.

Gathering stores is more efficient than individually storing single bytes within the L2 cache. This is because the RC machine's updating of a cache line with data from a store queue entry takes more cycles than the number of cycles required for updating the store queue entry with a new store operation. Also, each store operation at the L2 cache requires the RC machine to retrieve the entire cache line even when the store queue entry includes only a single store operation.

When a cache line entry is removed from the store queue to be sent to the L2 cache, the cache line entry is sent to an RC dispatch and assigned to an RC state machine, which updates the cache line of the L2 cache with the data from within the entry. Thus, for every RC machine assigned to a store operation, the entire cache line must be read and manipulated regardless of how many bytes of the cache line are actually being updated. It is thus more efficient to absorb multiple stores in the store queue entry before passing the line onto the L2 cache. Gathering stores also reduces the number of RC machine tenures required for store operations to a single cache line and also reduces the time required to update a cache line when multiple processor-issued stores update individual portions of the same cache line.

FIGS. 3B and 3C provide flow charts of the processes involved in completing a store operation from the store queue. FIG. 3B illustrates the general process for selecting an entry at the store queue for dispatch. The process begins at step 321 and proceeds to step 322, at which the STQ controller scans the valid bits of the entries to see which entries are eligible for dispatch. A determination is made at step 323 whether there are valid entries eligible for selection by the arbitration logic. When there are valid entries (i.e., entries with their valid bit 217 set/high), the arbitration logic selects an entry for dispatch from among all eligible entries and forwards the selected entry to the RC machine, as shown at step 324.

In determining which entry to select for dispatch, the arbitration logic looks at all the valid entries in the queue and determines, based on a set of architectural rules, which entries are eligible to be processed by the RC machine. For instance, an entry containing more recent stores cannot be processed before the entry with older stores to the same address, nor can store operations bypass barrier operations. The arbitration logic selects one of the eligible (valid) entries and signals the RC dispatch logic of the availability of that entry for dispatch to an RC machine. Conventional selection processes are typically via a round robin scheme amongst eligible entries.

Returning to FIG. 3B, a determination is made at step 325 whether the dispatch was successful. If the RC dispatch logic 219 accepts the request, the gathering of stores to that entry is stopped and the data within the entry is removed from the store queue, as depicted step 327. The RC dispatch 219 assigns the store to one of the RC machines 221 to complete the cache line update. If the RC dispatch rejects the request, the arbitration logic then selects another eligible store, if one is available, or tries again with the same entry if there are no others. When the dispatch was not successful, the process loops back to selecting a valid entry to send to the RC dispatch logic 219. For a successful dispatch, the valid bit, BE register, and other registers of the dispatched entry are reset, and the entry is made available for gathering a new set of store operations.

The RC machine 221 goes through several steps to update the L2 cache with the new store data. These steps are illustrated within the flow chart of FIG. 3C, which begins at step 331. The RC machine first determines at step 333 if a cache hit occurs, i.e., if the cache line is present in the L2 cache. If the line is not present in the cache, the RC machine places an address operation (with data request) on the system interconnect/bus that requests a copy of the cache line and write-permission for the cache line, as shown at step 343.

A determination is made at step 345 whether the request for write permission was successful. If the request was not successful, the request is reissued until the L2 cache is granted the necessary write permission. Notably, obtaining write permission when a miss occurs at the cache (i.e., the cache line is not present within the cache) requires a data operation to obtain a copy of the latest version of the cache line data. Also, in most instances, the coherency status of the other caches is updated/changed to indicate that the present L2 cache has current write permission.

Returning now to step 333, when the cache line is initially present within the L2 cache (i.e., a cache hit), a determination is made at step 335 whether there is permission to write to the cache line within the L2 cache. This check is required since the cache may not have permission to perform updates to the cache line, although the request by the RC machine hits within the cache. The RC machine thus issues an address-only operation on the bus to gain the write permission, as depicted at step 337.

A determination is made at step 339 whether the request for write permission was successful. If the request for write permission was not successful, a next determination is made at step 341 whether the line is still present within the L2 cache. In some instances (e.g., when the cache line request hits in the L2 cache but becomes stale before write permission can be obtained), a fetch of the data is required. When the line is still present in the L2 cache, the address-only write operation is retried. However, if the line is no longer present within the cache, the process shifts to step 343 which issues a request for both a copy of the line as well as write permission to the line.

All of the foregoing operations provide a copy of the targeted cache line within the L2 cache and provides the RC machine 221 with the necessary permissions to update the line. In general, the RC machine 221 only has to retrieve a copy of the data for the line when the line is not initially present within the cache. However, as described above, there are some cases where the cache line's data is updated by some other participant (processor, etc.) before the RC machine obtains write permission, and the RC machine must request a copy of the newly updated data from the other cache (or memory). When the cache line is present in the cache with sufficient write permission to immediately update the cache line data (i.e., a cache line hit with write permission—from step 335), no request for data and write permission is required to be issued to the system bus.

Returning to FIG. 3C, once the write permission is obtained and a current copy of the data is present to complete the updates, the RC machine retrieves the entire cache line from the cache and updates the portions of the line that are identified by the byte enable bits as having been updated within the store queue entry, as indicated at step 347. The process then ends as depicted at step 349.

Conventionally, the byte enable bits are utilized to select individual byte multiplexers (MUXes) for each byte of the cache line. The MUXes select either the old cache line data or the new data from the store queue entry based on which one of the byte enable bits are set. Finally, the updated cache line data is written back into the L2 cache with the data updates from the store queue and the RC machine is retired.

The above-described method of updating a cache line within the L2 cache with data from a store queue entry (as described above) yields a number of inefficiencies, particularly when the entire cache line is going to be updated. It is known that processing of certain types of code, such as scientific code, typically yields sequential streams of stores which modify an entire cache line. With conventional implementation, the arbitration logic that selects which entries to forward to the RC dispatch does not account for whether or not the selected entry has gathered a full set of store operations and will be updating the entire cache line.

Also, whenever the RC machine's request for the cache line misses at the L2 cache, the RC machine immediately issues one or more operations to the system bus to obtain a copy of the cache line's data and permission to write to the line. Then, when the data is returned, the line is updated with the data from the store queue entry. However, with updates that overwrite the entire cache line, the latency in waiting for the cache line data to be returned to the L2 cache when that data is going to be immediately overwritten is very inefficient.

The present invention recognizes the need for more efficient implementation of cache line updates via RC machines when gathered stores update an entire cache line. The invention further recognizes that it would be desirable to provide a method for completing full cache line updates without having to first retrieve the cache line data from another cache. A method and system that reduces traffic on the data bus and substantially eliminates the latency involved in waiting on data that will only be overwritten would be a welcomed improvement. These and other benefits are provided by the invention described herein.

SUMMARY OF THE INVENTION

Disclosed is a method and processor system for completing full cache line stores to a processor cache via a single RC machine tenure and address-only operations. A store queue is designed with a series of AND gates connecting individual bits of the byte enable bits of each store queue entry. The AND gates provide a single AND output that is routed to the STQ controller. During a gather of a store operation to the entry, the corresponding byte enable bit is set and the AND output updated accordingly. When a complete set of stores are gathered to an entry (i.e., all the stores required to update a full cache line), the AND output becomes a logic high.

When an entry of the store queue is selected for dispatch, the STQ controller checks the AND output for that entry (i.e., whether the AND output is a logic high, indicating a full entry). If the AND output indicates the entry is full, the STQ controller transmits a signal to the RC dispatch indicating that the entry is full and that the RC tenure will update the entire cache line.

The RC dispatch signals the full status to the RC machine to which the entry is assigned to complete the update of the cache line. The RC machine obtains write permission to the line, if such permission is not already available at the cache, and then the RC machine overwrites the entire contents of cache line with the data of the store queue entry. Write permission is obtained with an address-only operation (i.e., with no data tenure). Since the entire cache line is being updated, only write ownership is requested regardless of whether the cache has a current copy of the data.

The invention substantially eliminates data retrieval operations on a system bus during RC machine updates that overwrite an entire cache line. Also, the invention facilitates completion of full cache line updates via a single RC machine tenure.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention provides a method and processor-chip design/configuration by which data operation on the system bus are substantially eliminated when an entire cache line is being updated by a full set of processor issued stores in a store queue entry. The invention enables direct updates of the cache line without requiring a data tenure when either: (1) the cache does not have a copy of the cache line being written to; or (2) the data in the cache line goes stale while the processor is trying to obtain write permission for the cache line. The invention involves some enhancements and/or additions to the bookkeeping logic (i.e., byte enable bits, etc.) of the store queue mechanism and changes in logic of the RC mechanism to prevent issuance of a data fetch/request operation that will fetch a copy of the data for a target cache line when that copy of the data is going to be completely updated.

Figure 1:
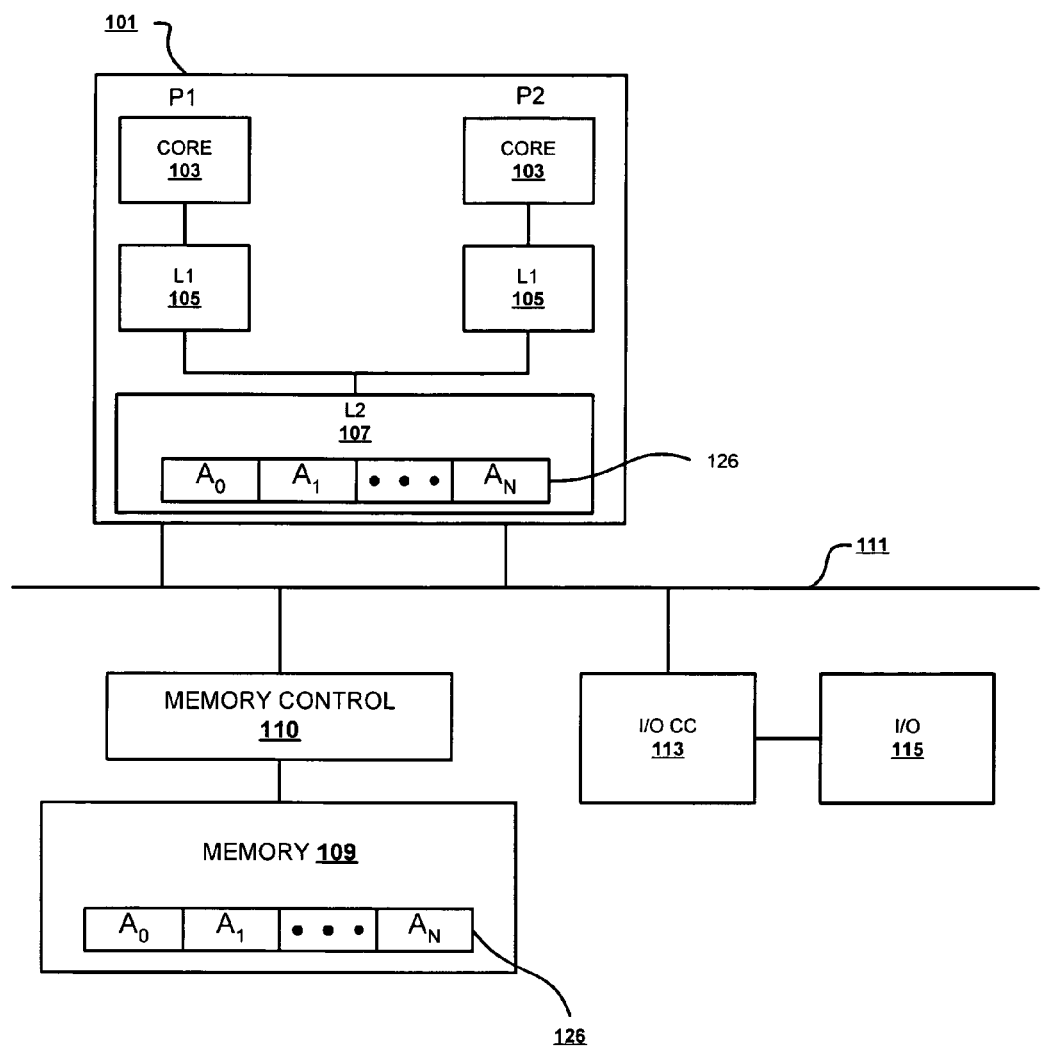
FIG. 1 is a block diagram illustrating a multiprocessor data processing system within which the various features of the invention may advantageously be completed.

With reference now the figures and in particular to FIG. 1, there is illustrated a multi-processor data processing system (MP) 100. MP 100 comprises several major components including processor chips 101, memory 109, and I/O device(s) 115. I/O device(s) have an associated I/O controller 113, while memory 109 has an associated memory controller 110 that controls access to and from memory 109.

Processor chips 101 are connected to memory 109 and I/O devices 115 via interconnect (system bus) 111 by which processor chips 101 communicate with each other and with memory 109, I/O devices 115, and other peripheral devices. Interconnect 111 is a bifurcated bus with a data bus for routing data and a separate address bus for routing address transactions and other operations.

Processor chips 101 each contain two processor cores 103, and onboard L1 cache 105 and shared L2 cache 107. According to the present invention, L2 caches 107 support intervention. Further, each cache is designed with a cache directory, an array of cache lines, and all data operations at each cache are completed according to a coherency protocol, such as a MESI coherency protocol.

The various features of the invention are carried out by logic components on processor chips 101 and affect store operations at the store queue and at specific cache lines within lower-level caches. For illustrative purposes, a sample cache line is provided within L2 cache, and the invention is described from the perspective of updating a cache line (A) in the L2 cache with store operations issued by a processor core and temporarily buffered in a store queue entry. As illustrated within L2 cache 107 of FIG. 1, exemplary cache line A 126 may contain multiple blocks/granules of data, corresponding to individual bytes, words, double words, etc., each of which may be the target of an update by a processor-issued store operation. The specific size of each cache line 126 and number of updatable data blocks/granules may differ from system to system, and the exact parameters utilized within the invention are adjusted accordingly to provide the general functionality described herein. While the present invention is described with specific reference to the L2 cache within a multi-level cache architecture, it is understood that the cache architecture need not be a multi-level one.

The invention primarily describes individual store operations that together update and/or modify an entire cache line. It is understood, however, that certain conditions, which are described below, may affect the ability of a single entry to gather a full set of the store operations to update an entire cache line. Thus the processes of the invention also account for updates of only a portion of a cache line. When an RC machine tenure is not updating the entire cache line, the processes at the L2 cache are similar to conventional processes for updating a cache line at L2 cache. However, when the processing of a store queue entry updates an entire cache line, the RC machine completes the update of the cache line without requiring a copy (or current copy) of the cache line present in the L2 cache. This requires enhancement of the RC machine logic to enable direct processor-issued updates to a invalid or stale or shared copy of a cache line that becomes stale (i.e., a copy in the Invalid state in the MESI coherency protocol) without first importing/requesting a most-coherent copy of the data from the memory hierarchy.

The present invention is described with reference to MP 100 and component parts of MP 100 illustrated by FIG. 1 and FIG. 4 (described below), but the present invention may be applied to different configurations of data processing systems that are not necessarily conventional. As an example, the invention may be implemented within a non-uniform memory access (NUMA) system, wherein the system memory (RAM) is divided among two or more memory arrays (having separate memory controllers connected to the system bus) and allocated among the processing units. Also, MP 100 could include new hardware components not shown in FIG. 1, or have a novel interconnect architecture for existing components. MP 100 may also have a different number of processing units. Those skilled in the art will therefore appreciate that the present invention is not limited to the generalized system shown in FIG. 1.

Figure 4:
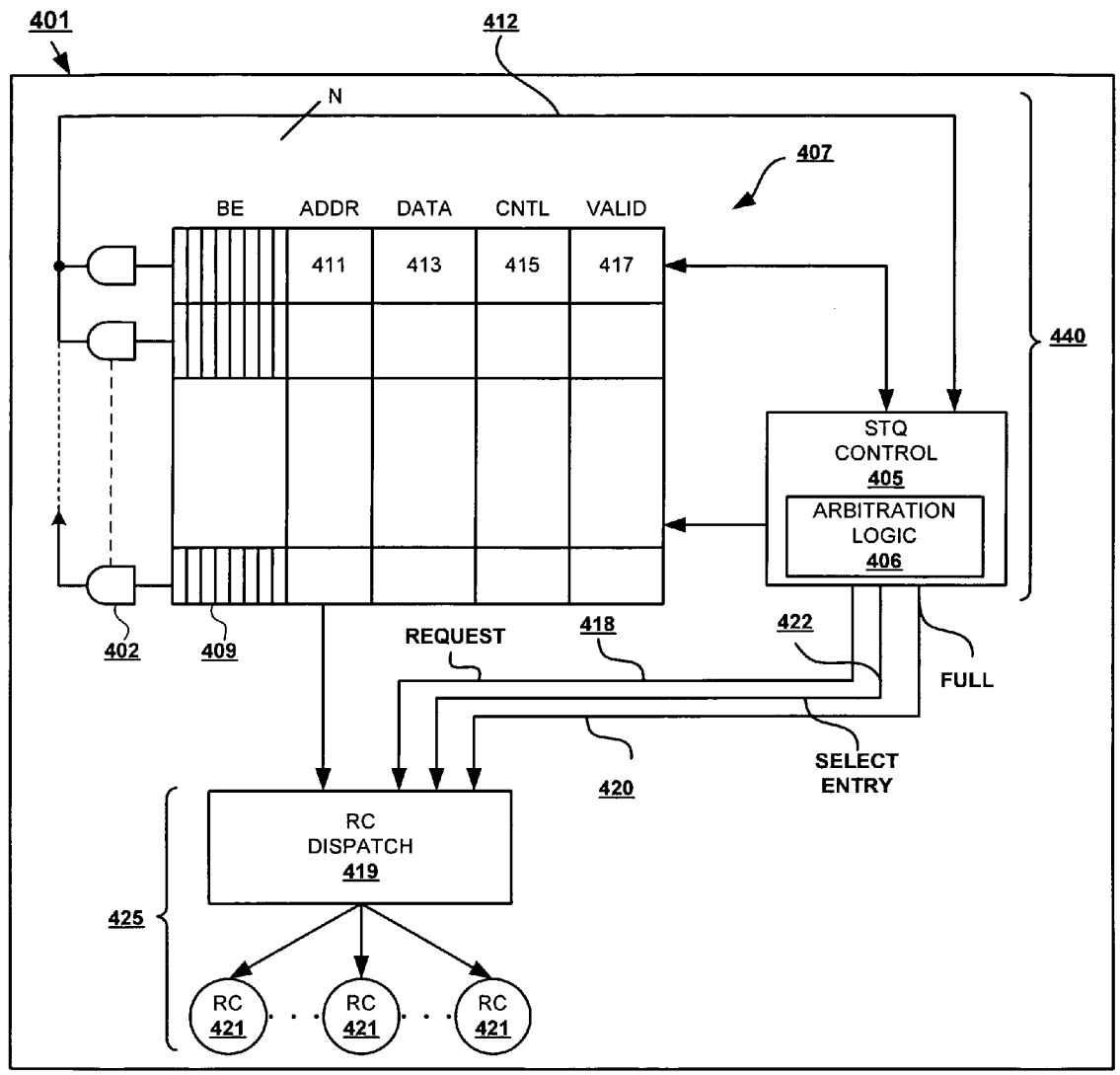
FIG. 4 is a block diagram of a store queue configured with AND logic to track the gathering of a fall set of store operations into a store queue entry to update an entire cache line in accordance with one implementation of the invention.

While the invention is practiced within the general data processing system 100 of FIG. 1, the particular implementation features of the invention are provided within the store queue and associated components of the processor chip, as exemplified by FIG. 4. Implementation of the invention requires certain enhancements to the store queue and STQ controller, as well as enhancement to the processing methods of the RC machines at the cache.

Figure 2:
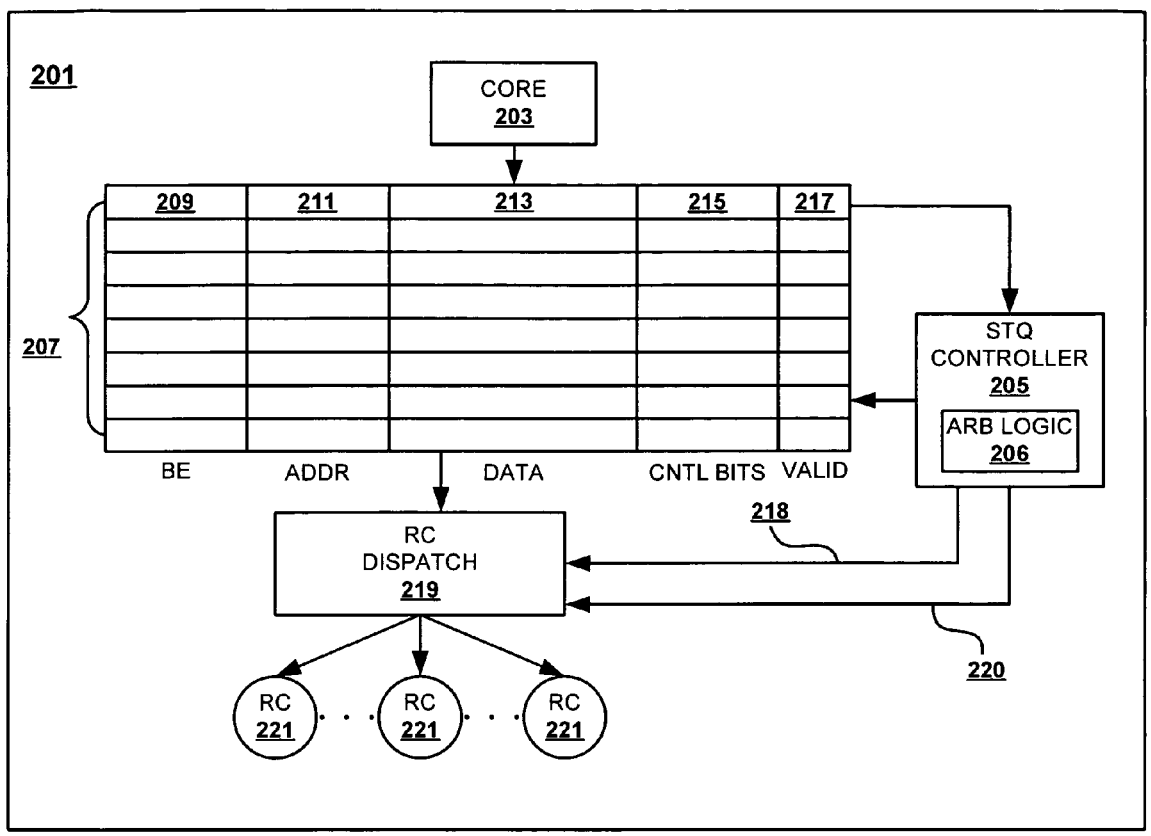
FIG. 2 is a prior art representation of processor components utilized to complete a store operation to an on-chip cache.
Figure 3A:
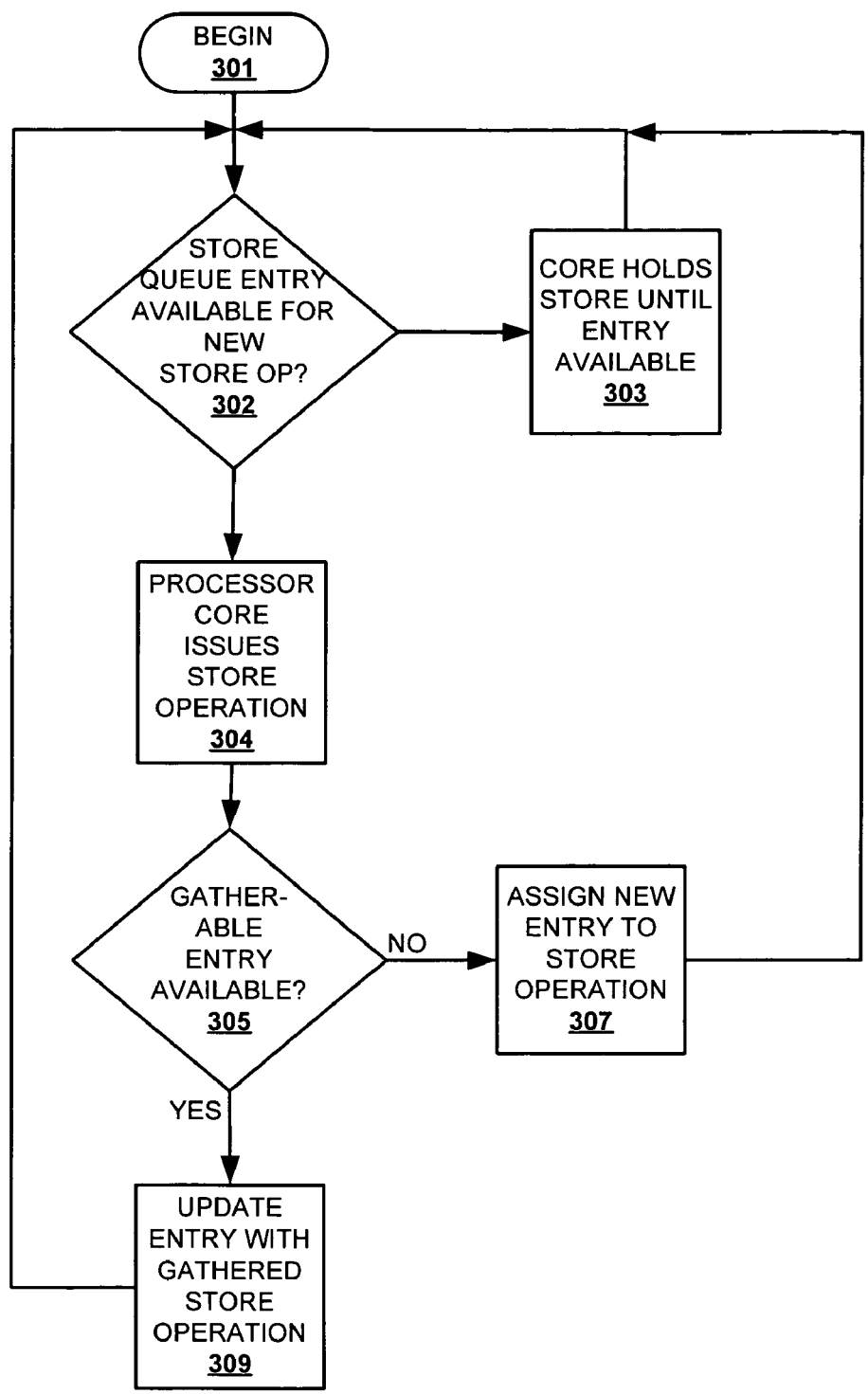
FIG. 3A is a flow diagram illustrating the process of storing data to an entry of a store queue according to prior art.
Figure 3B:
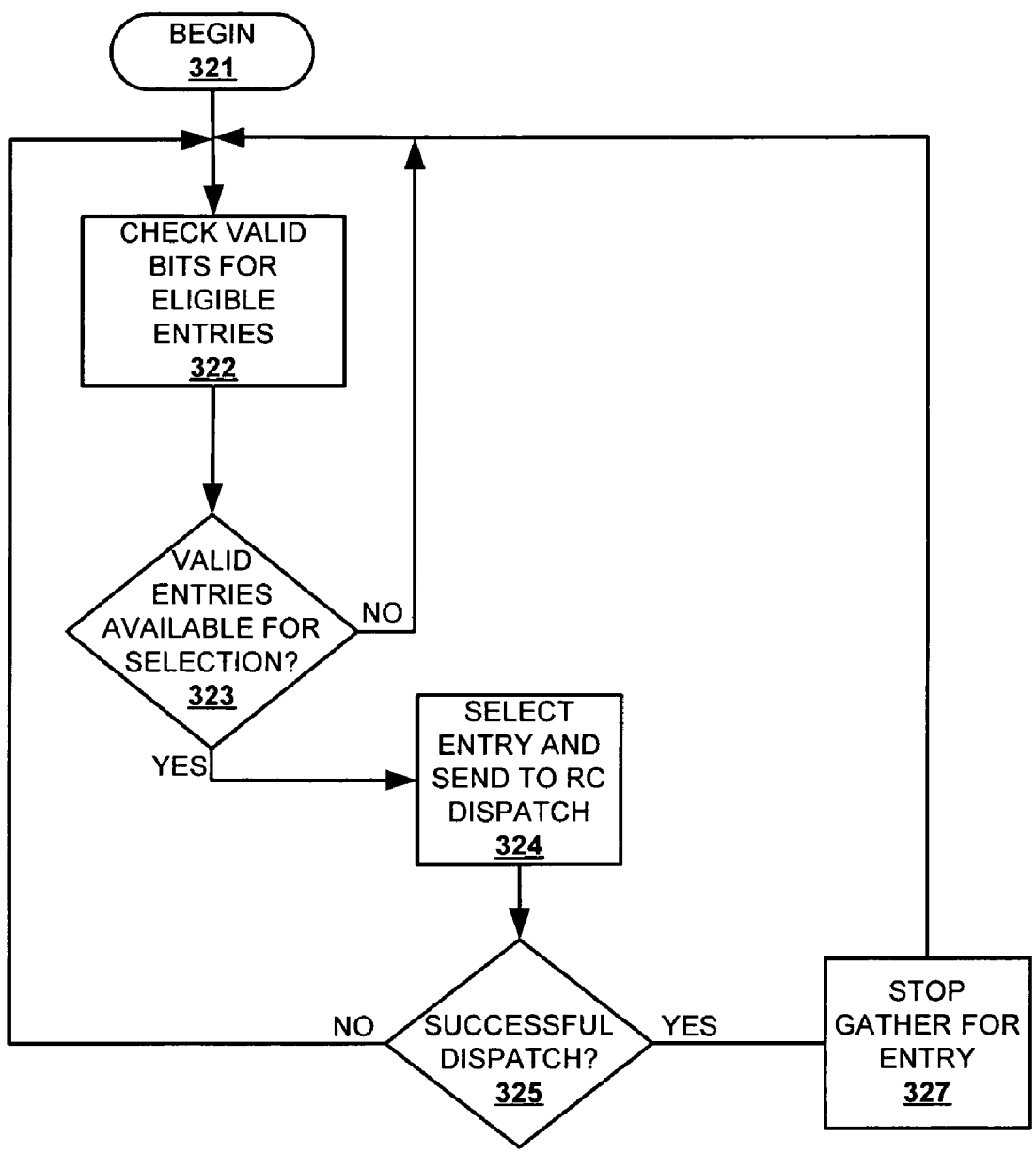
FIGS. 3B and 3C are flow diagrams illustrating two parts of the process of storing data to cache lines utilizing a store queue and RC machines according to prior art.
Figure 3C:
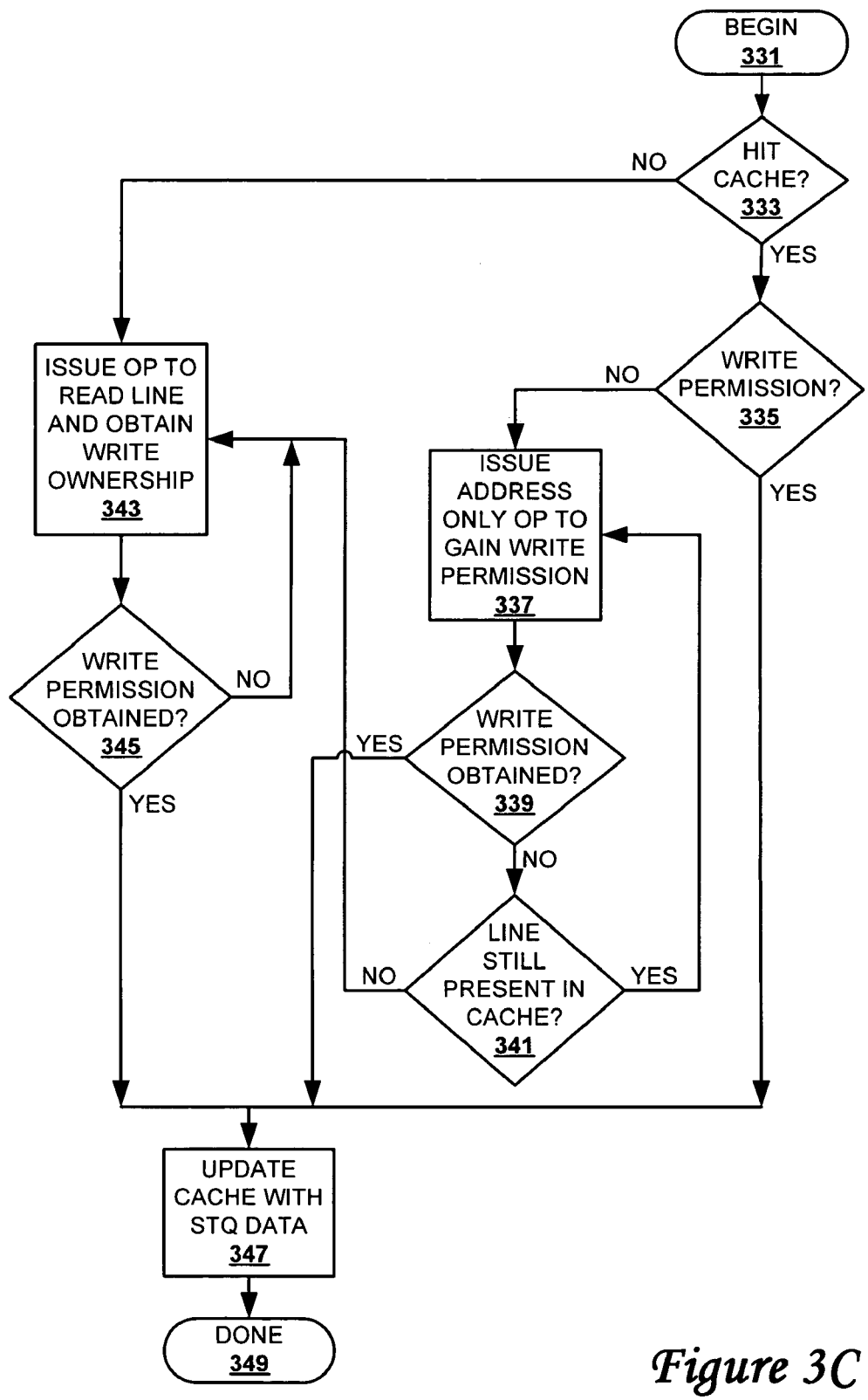

Unlike the configuration of FIG. 2, several enhancements are provided within the design of the store queue mechanism 440 of the processor chip 401, particularly the store queue 407 and RC machines 421 of the RC mechanism 425. Among these enhancements are additional logic components that: (1) track when an entry is full (i.e., contains a full set of store operations for updating an entire cache line); and (2) signal that the entry is full to the STQ controller. Also, modifications are provided to existing logic components to: (1) signal the RC dispatch when an entry selected for dispatch is full; and (2) enable update of an entire cache line without utilizing data tenure on the system bus. In one implementation, the invention provides changes to the store queue arbitration logic 406 to ignore entries that are still gathering stores and increase the likelihood of gathering full sets of store operations.

With specific reference to FIG. 4, there is illustrated a store queue mechanism 440 with store queue 407 that includes the standard registers for storing information, namely address register 411, data register 413, control bits 415, valid bit 417, and byte enable register 409. As shown, byte enable register 409 contains a number of bits, each corresponding to a smallest size of store granule within the data register 413. For simplicity, the invention will be described with cache lines having a length/capacity of 128-bytes that are updated via a plurality of processor-issued store operations.

In addition to those components described above, one embodiment of the invention also extends the bookkeeping logic to include programmable comparators (e.g., the AND gates or other logic within the STQ controller in lieu of AND gates) and provides changes to the STQ controller logic to signal dispatch of full entries to an RC machine. Coupled to each byte enable register 409 is an AND gate 402 (or series of AND gates) utilized to determine when a data register (of the entry) within the store queue is full. AND gate output signal 412 is provided as an input to STQ controller 405. STQ controller is designed with additional logic to respond to selection of an entry when AND gate output signal 412 indicates that the entry is full. In one implementation, the additional logic marks the entry as eligible for dispatch and signals the RC dispatch 419 of the full status of the selected entry.

In an alternate embodiment, valid bit 417 is extended to include two bits, with a first bit indicating the conventional "entry valid" status and the second bit indicating an "entry full" status. This provides a valid/full register in lieu of the valid bit, and the valid/full register tracks the two parameters associated with the store queue entry. With this configuration, the AND output 412 is provided to the valid/full register and sets the associated bit to a logic high when the data register within the entry is full. The value of this bit is then utilized by the STQ controller 405 to determine the condition of the entry (full or not) when the entry is forwarded to the RC mechanism 425 for dispatch. In one implementation, a pre-selected control bit 415 is utilized as the entry full bit.

When an entry is marked as eligible for dispatch, the arbitration logic selects one of the eligible entries and issues a request signal to the RC dispatch 419 along with the number of the entry. RC dispatch 419 receives three inputs from the STQ controller 405, request signal 418, select entry (identifier) 422 and full entry signal 420 as an input signal from STQ Controller 405. Full entry signal 420 informs the RC dispatch when the entry contains a full set store operations. In one embodiment, STQ controller 405 includes a switch or other mechanism for activating full line 420 when an entry that will update a full cache line is signaled by select entry 422.

In an alternate embodiment, full entry signal 420 is an extension of AND output 412 received by STQ controller 405 and automatically alerts RC dispatch 419 when the select entry 418 is a full entry. Notably, alternate embodiments may utilize different combinations of logic components (other than AND gates) to determining when a cache line is full. These embodiments may also provide a different response to a full line signal other than making an entry eligible for dispatch.

Figure 5A:
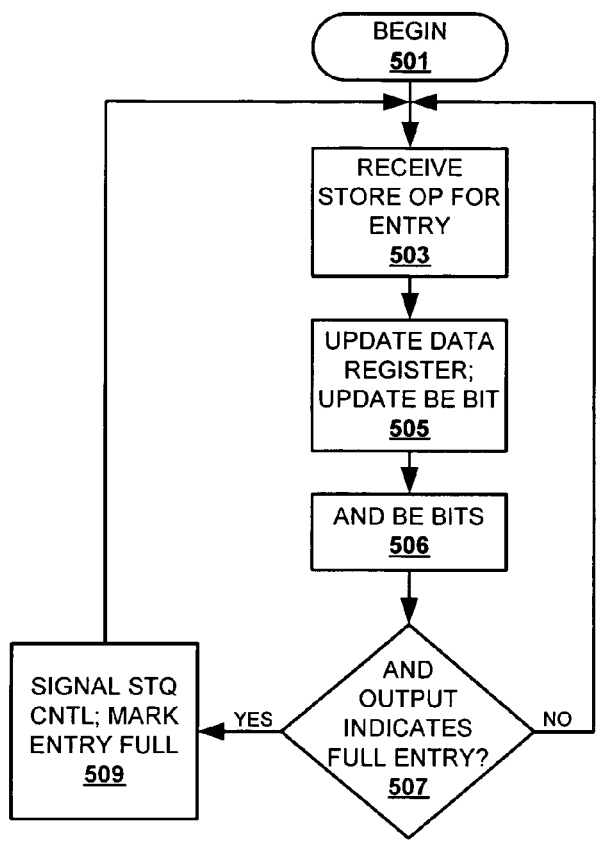
FIGS. 5A and 5B are flow charts illustrating the processes of determining when a full set of store operations are gathered within an entry and utilizing that information during dispatch of the entry according to one implementation of the present invention.
Figure 5B:
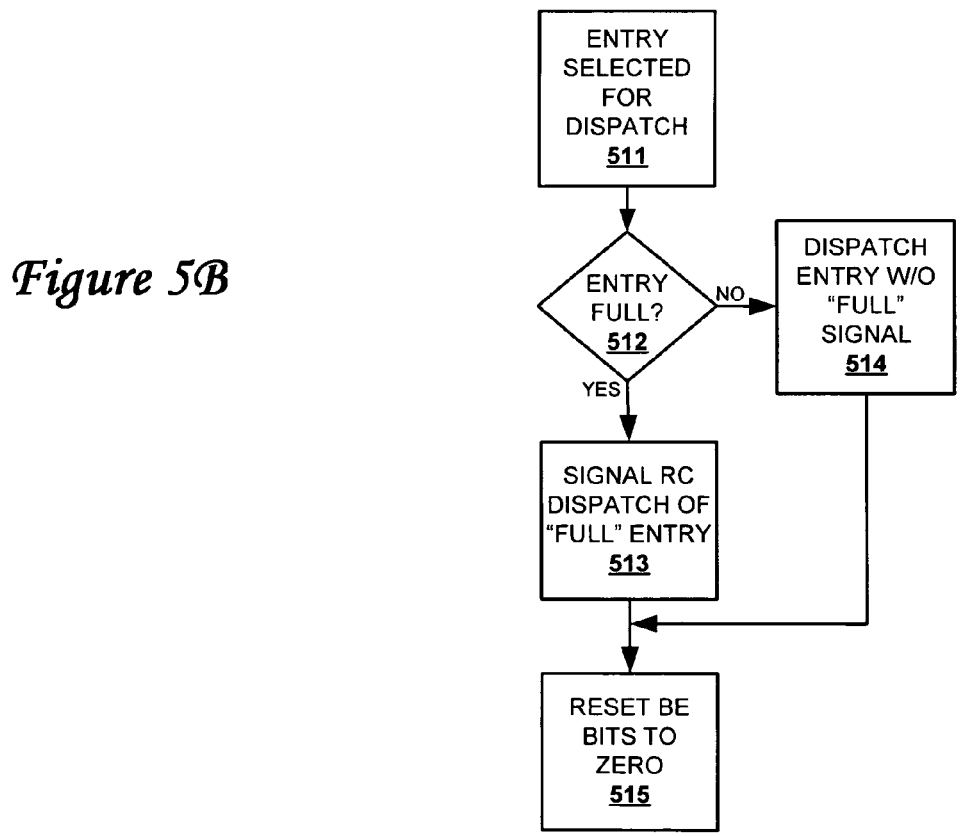

FIG. 5A is a flow diagram illustrating the process of determining when a full set of store operations is gathered within an entry and FIG. 5B illustrates how that information is utilized during dispatch of the entry. For each entry in the store queue a number of bookkeeping flags (i.e., byte enable bits) are concurrently maintained to indicate whether the corresponding store granule (e.g., byte) of the entry has been updated in the entry. Also, for each entry in the store queue, the "byte enable" bits are coupled to the input of a logical AND gate to produce an output signal indicating whether all the store granules in the entry have been updated by store operations issued from the core.

The process of FIG. 5A begins at step 501 and proceeds to step 503 at which a store queue entry receives a store operation. The data and address of the operation are stored within respective registers of the entry and a corresponding bit within the byte enable (BE) register is set to logic "1" as shown at block 505. Following, the bits within the BE register are logically ANDed as shown at block 506, and a determination made at block 507 whether the logical ANDing of the bits yields a logic high (1) as the output, indicating the entry is full. If the ANDing process results in a logic high output, then all the storage granules within the entry have been updated and the STQ controller is signaled at step 509 and marks the entry as full. When the output is not logic high, indicating the entry is not full, the process returns to step 503 at which a new store operation is received.

Referring now to FIG. 5B, an entry is selected for dispatch at step 511. The arbitration logic selects one of the eligible entries and signals the selection to the RC machine. A check is made at step 512 whether the selected entry is full, and when a full entry is selected, the STQ controller also signals the RC dispatch that the selected entry is full, as indicated at step 513. Alternatively, as shown at step 514, no signal is sent to the RC dispatch when the selected entry is not full. Moving on to step 515, once the content of the entry is dispatched to an RC machine, the entry is reset and the BE bits are also reset.

Figure 5C:
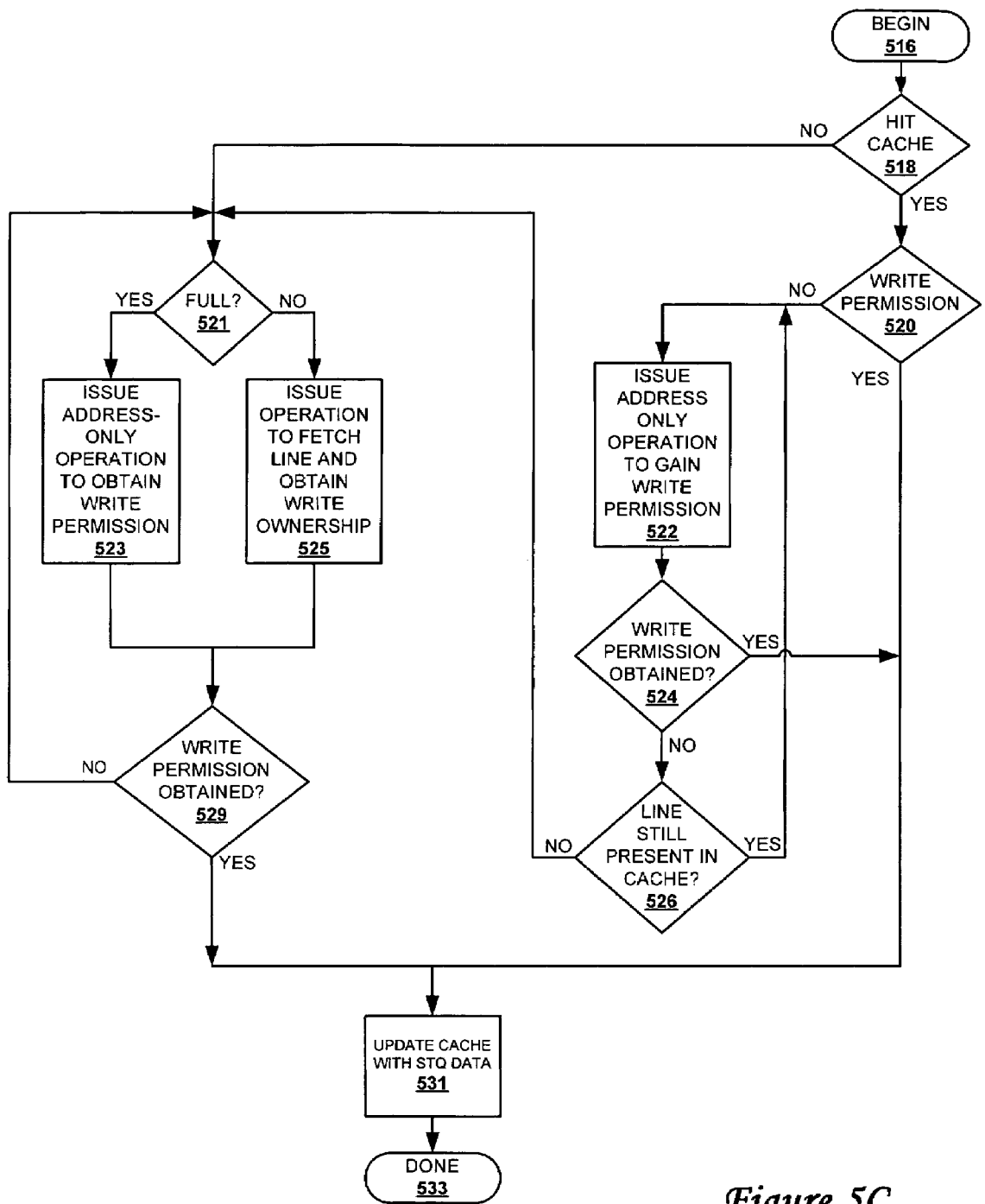
FIG. 5C is a flow chart of the process of completing cache line updates with a store queue entry that contains a full set of store operations to overwrite an entire cache line according to one embodiment of the present invention.

Once an entry is selected, the data and associated address from the address register of the entry are forwarded to the RC dispatch 419, and the update of the cache line is assigned to an RC machine 421. FIG. 5C provides a flow chart of the processing that occurs at the cache level once the RC machine is provided with data from an entry of the store queue with which to update the target cache line. The process begins at step 516 and proceeds to step 518 at which a determination is made whether a cache hit occurs. When a cache hit occurs, a next determination is made at step 520 whether the cache has the necessary write permission for the target cache line. Assuming the cache hit has occurred but the write permission is not owned by the cache, an address-only operation is issued to the system bus to obtain write permission for the line as illustrated at step 522. At step 524, a check is made whether the write permission was successfully obtained. If the write permission was not obtained, a next determination is made at step 526 whether the cache line is still present within the local cache. If the line is still present within the cache, the request for write permission is retried at step 522.

When either a cache miss occurs at step 518 or a cache line was subsequently removed from the cache before write permission is obtained (determined at step 526), a check is made at step 521 whether the store queue entry is full. If the entry is not full, then at step 525, a read operation is issued to get a copy of the cache line data from another cache (or memory) and obtain write permission. However, when the entry is full, indicating that there is to be a complete update of the cache line data, an address-only operation (i.e., an operation with no data tenure) is issued on the bus to obtain the write permission as indicated at step 523. A check is then made at step 529 whether the write permission was successfully obtained. Notably, the determination assumes that the data is present within the cache whether preceded by step 523 or step 525. When the write permission was not obtained, the step of obtaining the write permission is repeated. Once the write permission is obtained, however, the cache line is updated with the data from the entry, and the updated cache line stored within the cache as shown at step 531. The process then ends for that entry as indicated at step 533.

Thus, when the entry being processed is full, the RC machine does not have to fetch the cache line data if the data is not present in the L2 cache. The update to the cache line is automatic once write permission is obtained. The elimination of the data tenure occurs with a cache miss and also when cache line data goes stale before write permission is obtained. The conventional data fetch operation is replaced by issuance of an address-only operation on the bus that obtains write ownership for the cache line without fetching the data. This address-only operation results in less data bus traffic and bus resource utilization. The invention thus provides a more efficient implementation of cache line updates via RC machines.

While the invention has been particularly shown and described with reference to a preferred embodiment, it will be understood by those skilled in the art that various changes in form and detail may be made therein without departing from the spirit and scope of the invention. For example, although the invention described is with AND logic to complete the check for a full store queue entry, other implementations may utilize different types of logic components to deduce when an entry is full and signal the full state to the STQ controller. These alternate implementations all fall within the scope of the invention.

What is claimed is:

1. In data processing system having multiple processors each having a processor core, store queue (STQ) mechanism, read claim (RC) mechanism, and associated processor cache, a method for facilitating cache line updates responsive to processor-issued store operations, said method comprising:

determining when a store queue entry selected for dispatch by an RC machine provides an update to an entire cache line by:

tracking processor issued store operations gathered to said store queue entry via byte enable bits, wherein each storage granule of multiple storage granules within said store queue entry is provided a corresponding byte enable bit that is set to a logical high value when the storage granule is updated by a store operation, wherein the byte enable bit retains a logical low value when no update occurs to the corresponding storage granule, wherein each of multiple byte enable bits corresponding to the multiple storage granules are set to the logical high value when all the storage granules within the entry have been updated;

logically ANDing each of the multiple byte enable bits of the store queue entry to determine when all storage granules of said store queue entry have been updated; and providing a full signal to a STQ controller when said logically ANDing step results in a logical high value, which indicates that all storage granules of said entry have been updated; and completing said update to said entire cache line with address-only operations, wherein no data tenure is requested when an entire cache line is being overwritten, wherein said completing includes:

receiving at said RC mechanism an entry select identifying the entry for dispatch;

receiving at said RC mechanism a signal indicating that the entry is full;

assigning the cache line update operation to an RC machine of said RC mechanism;

providing an indication to the RC machine that the entire cache line is being updated; and responsive to a receipt by said RC machine of the full signal indicating that the entry being dispatched is full, activating a cache update mechanism that enables the completion of the cache line update without requiring a copy of the cache line or current data within the cache line, wherein cache line updates from entries that are not full are completed with a current copy of the cache line within the cache and write permission to the cache line.

2. The method of claim 1, wherein said store queue mechanism includes the STQ controller, said method further comprising:

tagging said entry as eligible for dispatch when said full signal is received at said STQ controller; and enabling selection of said entry by arbitration logic of said STQ controller.

3. The method of claim 2, further comprising:

notifying the RC mechanism when said entry has been selected for dispatch; and signaling said RC mechanism when said entry is full.

4. The method of claim 3, further comprising:

automatically resetting said byte enable bits for the entry when the entry is dispatched to an RC machine of said RC mechanism, wherein a full signal is reset to no longer indicate the entry is full.

5. The method of claim 1, wherein following a miss at said processor cache or a hit at said processor cache with a cache line that becomes stale prior to completion of said update, said completing step comprises:

issuing an address-only operation to obtain write permission for said cache line; and automatically updating said cache line with data from said entry once said write permission is obtained.

* * * * *